US009106621B2

(12) United States Patent
Taima

(10) Patent No.: US 9,106,621 B2
(45) Date of Patent: Aug. 11, 2015

(54) RIGHTS MANAGEMENT SYSTEM AND METHOD INTEGRATED WITH EMAIL TRANSMISSION OF DOCUMENTS

(71) Applicant: KONICA MINOLTA LABORATORY U.S.A., INC., San Mateo, CA (US)

(72) Inventor: Katsuyuki Taima, Redwood City, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 3 days.

(21) Appl. No.: 14/092,014

(22) Filed: Nov. 27, 2013

(65) Prior Publication Data

US 2015/0149774 A1    May 28, 2015

(51) Int. Cl.
*H04L 29/06* (2006.01)
(52) U.S. Cl.
CPC .................................. *H04L 63/0428* (2013.01)
(58) Field of Classification Search
CPC ............ H04L 63/101; H04L 2209/603; H04L 63/0428; G06F 21/62; G06F 2221/2141
See application file for complete search history.

(56) References Cited

U.S. PATENT DOCUMENTS

| 2008/0155652 A1* | 6/2008 | DeBie | 726/2 |
| 2008/0159527 A1* | 7/2008 | Bentley et al. | 380/28 |
| 2014/0304762 A1* | 10/2014 | Puri | 726/1 |

FOREIGN PATENT DOCUMENTS

JP     2012-60270     3/2012

* cited by examiner

*Primary Examiner* — Izunna Okeke
(74) *Attorney, Agent, or Firm* — Chen Yoshimura LLP

(57) ABSTRACT

A rights management system and method allow users to easily associate rights management policies with documents send via email from a client (e.g. a computer or scanner). The client transmits email recipient information, including the attention type ("to," "cc" or "bcc") for each recipient, to a rights management server. The server stores multiple rights management policies each specifying access rights (e.g. view, edit, print) granted to specified users, and stores an attention-right rule defining a correspondence between access rights and attention types. Based on the recipient information from the client, and applying the attention-rights rule, the server selects an appropriate policy or creates a new one if an appropriate policy does not exist, and transmits the policy, a document ID and an encryption key to the client. The client encrypts the document, adds metadata to the document, and sends the email with the attached document to a mail server.

20 Claims, 2 Drawing Sheets

| Policy name | User | View | Edit | Print |
|---|---|---|---|---|
| Policy 1 | U1 | Yes | Yes | Yes |
|  | U2 | Yes | No | No |
| Policy 2 | U1 | Yes | Yes | No |
|  | U3 | Yes | Yes | No |
| Policy 3 | U1 | Yes | Yes | Yes |
|  | U2 | Yes | No | No |
|  | U3 | Yes | No | No |
| …… | … | … | … | … |

| Attn | View | Edit | Print |
|---|---|---|---|
| to | Yes | Yes | Yes |
| cc | Yes | No | No |
| bcc | No | No | No |

| Attn | View | Edit | Print |
|---|---|---|---|
| to | Yes | Yes | No |
| cc | Yes | No | No |
| bcc | Yes | No | No |

| Attn | User | View | Edit | Print |
|---|---|---|---|---|
| to | U1 | Yes | Yes | Yes |
| cc | U2 | Yes | No | No |
| cc | U3 | Yes | No | No |
| bcc | U4 | No | No | No |

RIGHTS MANAGEMENT SYSTEM AND METHOD INTEGRATED WITH EMAIL TRANSMISSION OF DOCUMENTS

BACKGROUND OF THE INVENTION

1. Field of the Invention

This invention relates to a rights management system and related method for digital contents, and in particular, it relates to a rights management system that is convenient for use when transmitting documents via emails.

2. Description of Related Art

Documents traditionally available only in hard copies are increasingly also available in digital forms. In fact many documents nowadays are prepared, generated, stored, distributed, accessed, read or otherwise used electronically in digital file formats such as Portable Document Format (PDF). With the wide use of digital file formats in document processing, digital rights management (DRM) systems are increasingly implemented to control user access and prevent unauthorized use of digital documents. The rights involved in using a digital document may include the right to view (or "read") the digital document, the right to edit (or "write") the digital document, the right to print the digital document in hard copies, the right to copy the digital document, etc. A user may access a digital document by acquiring (or being assigned) one or more of these rights, and any of the acquired or assigned rights may be later revoked for various reasons.

DRM systems are generally implemented for managing users' rights to the digital documents stored in the systems. For example, in some current rights management systems, a document can be associated with a rights management policy which specifies which user of the system has what kind of access rights to the document. The DRM systems enforce the rights management policies for documents managed by the system using various digital technologies such as encryption. Thus, when a user attempts to access a document, for example to open an encrypted PDF document for viewing, the DRM system applies the rights management policy associated with the document to determine whether the user is permitted to access the document in the attempted manner.

DRM systems may be implemented in various ways. In one example, a rights management server (RMS server or RMS) stores multiple rights management policies in a policy table. Each document managed by the system is associated with a policy, and the RMS stores the association between documents (e.g. as identified by a unique document ID) and policies. When a user runs an application on a client computer to access a document (which may be a copy of the document residing on the client computer), the application contacts the RMS server to seek permission. The RMS server receives relevant information from the client, such as the identity of the user, the identity of document, the type of access attempted, etc.; based on such information, the RMS server determines which rights management policy is associated with the document, and consults the policy table to determine whether access should be granted or denied to that user. If access is to be granted, the RMS server sends a decryption key to the client computer. Based on the reply from the RMS server, the application on the client computer will permit or deny the access sought by the user; if access is to be permitted, the client computer will use the decryption key to decrypt the document.

SUMMARY

The present invention is directed to a rights management method that allows users to easily attach rights management policies to documents that they send via email from a client (e.g. a client computer or a scanner).

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a digital rights management method implemented in a rights management system, the system including a rights management server computer and a client, the client being a client computer or a scanner, the method including: (a) the rights management server storing a rights management policy table which contains a plurality of rights management policies, each rights management policy indicating one or more users and document access rights granted or denied to each user, and storing an attention-rights rule which defines a correspondence between attention types of email recipients and document access rights to be granted or denied for each attention type, the attention types including at least "to" and "cc;" (b) the client receiving an email command from a user, the email command specifying one or more users as recipients of an email, each recipient having an attention type and specifying a document to be attached in the email; (c) the client transmitting a request to the rights management server, the request specifying the recipients of the email and the attention type of each recipient, and indicating that a document is to be attached in the email; (d) the rights management server determining, based on the attention type of each recipient received from the client and by applying the attention-rights rule, document access rights to be granted or denied to each recipient of the email; (e) the rights management server determining whether the document access rights to be granted or denied to each recipient, as determined in step (d), match a rights management policy stored in the rights management policy table; (f) if a matching rights management policy is found in step (e), the rights management server selecting the matching rights management policy; (g) if a matching rights management policy is not found in step (e), the rights management server creating a new rights management policy based on the document access rights to be granted or denied to each recipient of the email determined in step (d), and storing the created rights management policy in the rights management policy table; (h) the rights management server generating a unique document ID, associating the document ID with the rights management policy selected in step (f) or created in step (g), and storing the document ID; (i) the rights management server transmitting an encryption key and the document ID to the client; and (j) the client encrypting the document using the encryption key received from the rights management server, adding the document ID as metadata to the document, and transmitting the email with the recipients specified in step (b) and with the encrypted document as an attachment to an email server. The attention type may additionally include "bcc."

Step (i) may further include transmitting a name of the rights management policy selected in step (f) or the created in step (g) to the client, and step (j) may further include adding the name of the rights management policy as metadata to the document.

In another aspect, the present invention provides a digital rights management method implemented in a rights management server computer, which includes: (a) storing a rights management policy table which contains a plurality of rights management policies, each rights management policy having a name and indicating one or more users and document access rights granted or denied to each user; (b) storing an attention-rights rule which defines a correspondence between attention types of email recipients and document access rights to be granted or denied for each attention type, the attention types including at least "to" and "cc;" (c) receiving, from a client computer or a scanner, a request which specifies a list of one or more users as recipients of an email and an attention type of each recipient, the request further including that a document is to be attached in the email; (d) determining, based on the attention type of each recipient and by applying the attention-rights rule, document access rights to be granted or denied to each recipient of the email; (e) determining whether the document access rights to be granted or denied to each recipient, as determined in step (d), match a rights management policy stored in the rights management policy table; (f) if a matching rights management policy is found in step (e), selecting the matching rights management policy; (g) if a matching rights management policy is not found in step (e), creating a new rights management policy based on the document access rights to be granted or denied to each recipient of the email determined in step (d), and storing the created rights management policy in the rights management policy table; (h) generating a unique document ID, associating the document ID with the rights management policy selected in step (f) or created in step (g), and storing the document ID; and (i) transmitting an encryption key and the document ID to the client computer or the scanner for encrypting the document to be attached in the email. The attention type may additionally include "bcc."

Step (i) may further include transmitting a name of the rights management policy selected in step (f) or the created in step (g) to the client computer or the scanner.

In yet another aspect, the present invention provides a digital rights management method implemented in a client, which includes: (a) receiving an email command from a user, the email command specifying one or more users as recipients of an email, each recipient having an attention type which is selected from a group comprising at least "to" and "cc," and specifying a document to be attached in the email; (b) transmitting a request to a rights management server, the request specifying the recipients of the email and the attention type of each recipient, and indicating that a document is to be attached in the email; (c) receiving from the rights management server a response to the request, the response including a document ID and an encryption key for encrypting the document; (d) encrypting the document using the received encryption key; (e) adding the document ID as metadata to the document; and (f) transmitting the email with the recipients specified in step (b) and with the encrypted document as an attachment to an email server. The group of attention types may further include "bcc."

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above methods.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide a method that allows email users to easily attach rights management policies to documents that they send via email.

In a current DRM system, when a user sends a document as an attachment in an email, the user is required to specify the rights management policy to be associated with the document. The user can either choose one policy from a list of policies presented by the RMS server, or create a new policy. Typically, the RMS server stores many policies, and it may not be easy for the user to select an appropriate policy even when the policies are given user-friendly and intuitive names.

In embodiments of the present invention, when sending a document by e-mail, the DRM system automatically selects an appropriate rights management policy, or create one if a suitable policy does not already exist, for the document based on the recipients of the email and their attention type (e.g. "to," "cc," or "bcc"). The system will automatically associate the rights management policy with the attached document without the intervention of the sending user. In one particular example, the rights management policy is selected or created based on the following rules: The user(s) whose attention type is "to" (i.e. primary recipients) will be given all access rights to the attached document; the user(s) whose attention type is "cc" (i.e. carbon-copied recipients) will be given read-only right to the document; and the user(s) whose attention type is "bcc" (i.e. blind carbon-copied recipients) will not be given any access rights to the document. Other rules may be applied. Generally, the "to" recipients are given higher access rights than the "cc" recipients, and the "cc" recipients are given higher or equal access rights as the "bcc" recipients. These rules, which define the correspondence between attention types and rights to be granted or denied, are referred to as attention-rights rules in this disclosure.

Figures 1, 2, 3A, 3B, 4:
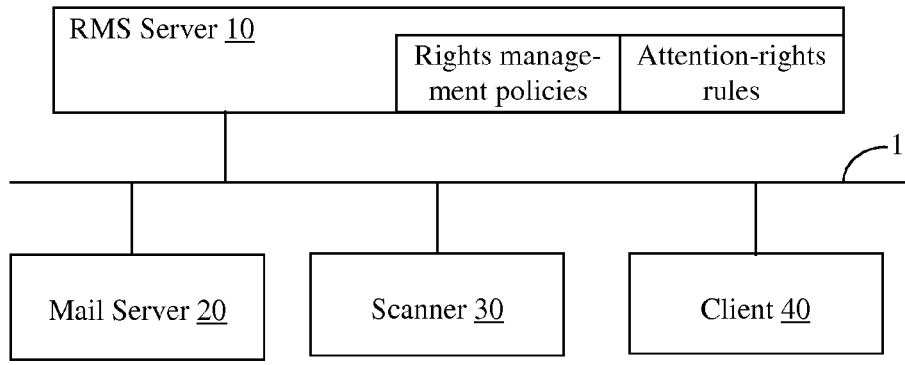
FIG. 1 schematically illustrates a data processing system in which embodiments of the present invention may be implemented.
FIG. 2 schematically illustrates an exemplary rights management policy table stored in an RMS server.
FIGS. 3A and 3B schematically illustrate two exemplary attention-rights rules used by the RMS server according to an embodiment of the present invention.
FIG. 4 schematically illustrates an exemplary list of users with desired document access rights for a particular email.

The method can be implemented in a system shown in FIG. 1. The system includes one or more client computers 40, one or more scanners 30, a mail server 20, and a rights management server 10, connected to each other via a network 100. The scanner 30 may be a multi-function device (MFP), sometimes also referred to as an AIO or all-in-one device, which is a device that combines print, scan and copy functions. A user may send emails from the client 40 or the scanner 30. The scanner 30 is equipped with a user interface panel with control keys that allows the user to perform copy, scan and other functions. In this embodiment, the scanner implements a function (sometimes referred to as "scan to email") that allows a user to scan a hardcopy document into a digital document and email it to other users directly from the scanner.

The network 100 may be any suitable network, including a LAN, WAN, the Internet, etc. The devices 10, 20, 30 and 40 include necessary hardware such as processors, memories, etc. and software to perform the functions described herein.

FIG. 2 schematically illustrates an exemplary rights management policy table stored in the RMS server 10. This type of rights management policy tables are used in existing digital rights management systems. As shown in FIG. 2, each policy in the policy table has a policy name (e.g. "Policy 1," "Policy 2," etc.) and specifies the document access rights granted or denied to certain specified users. For example, Policy 1 specifies that user U1 has rights to view (read), edit (write) and print a document, and that user U2 has rights to view the document but not to edit or print it; Policy 1 also implies that other users are not granted any rights.

FIGS. 3A and 3B schematically illustrates two exemplary attention-rights rules stored in the RMS server 10. Each rule is a table that defines a correspondence between access rights (e.g. view, edit, print) and the attention types (e.g. to, cc, and bcc) for an email. In the exemplary attention-rights rule shown in FIG. 3A, a user who is a primary recipient (attention type "to") of an email will be granted rights to view, edit and print attached documents; a user who is a carbon-copy recipient (attention type "cc") will be granted rights to view but not to edit or print the documents; and a user who is a blind carbon-copy recipient (attention type "bcc") will be granted no rights to view, edit or print the document. The example in FIG. 3B specifies a different attention-rights rule.

Figure 5:
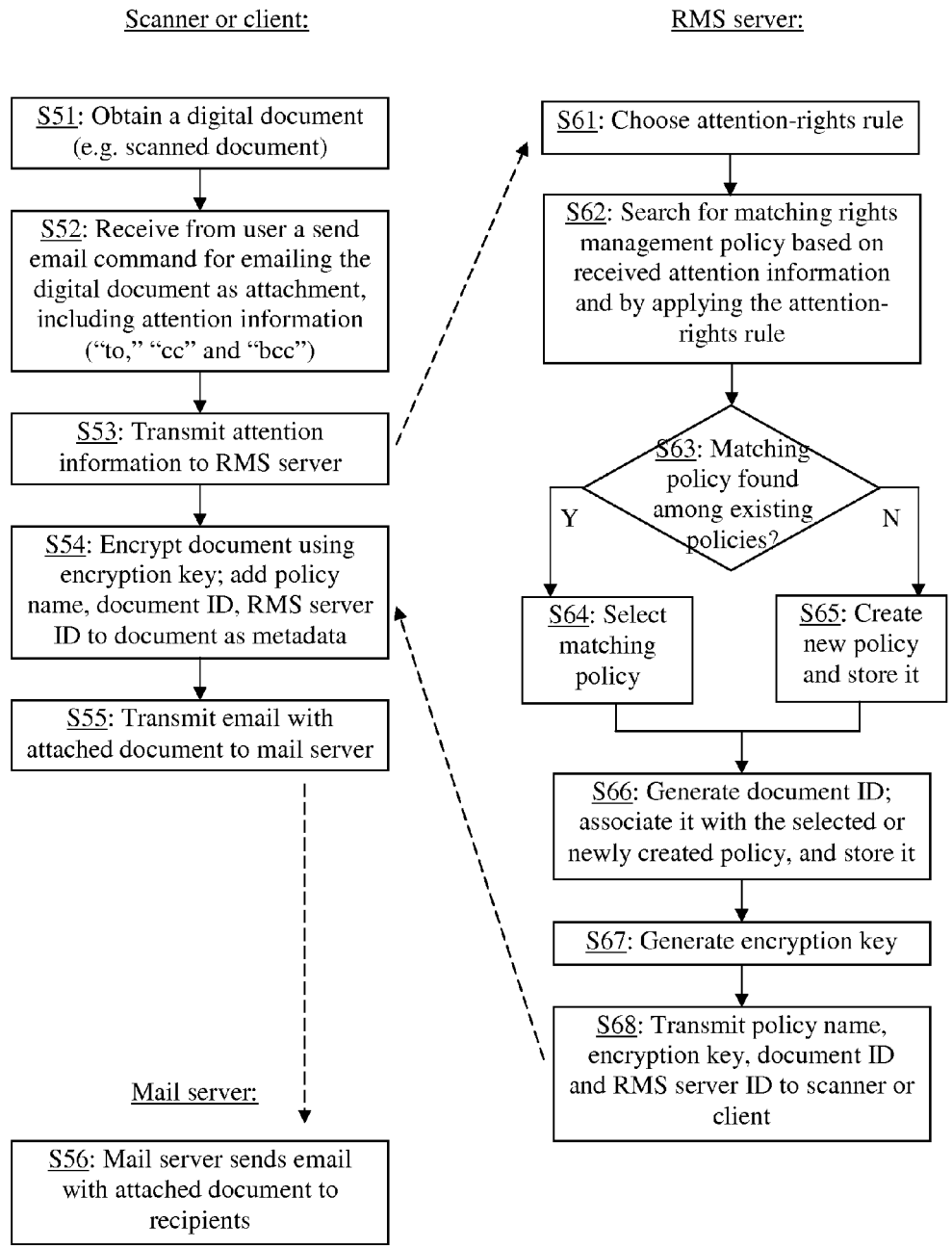
FIG. 5 schematically illustrates a process according to an embodiment of the present invention, implemented in the data processing system of FIG. 1 to handle rights management when sending documents by email.

FIG. 5 schematically illustrates a process for sending an email with attached documents according to an embodiment of the present invention. This description below uses a "scan to email" operation via a scanner 30 as an example; the process for sending an email from a client computer 40 is similar, as noted below.

As shown in FIG. 5, the user scans a hardcopy document using the scanner 30 to obtain a digital document (step S51). Using the user interface panel of the scanner 30, the user issues a command to email the digital document to one or more recipients (step S52). This includes inputting the attention information of the email, i.e. user names and email addresses of the various types of recipients including "to," "cc" and "bcc" ("cc" and "bcc" are optional). Other information such as subject and message is preferably also inputted in this step. Upon receiving the email command, the scanner 30 transmits the attention information (and optionally, the subject and the body of the email message as well) to the RMS server 10, along with a request for policy (step S53).

In the scanner 30, steps S51 and S52 may be implemented in a semi-automated manner using an interactive user interface. For example, the scanner may allow the user to set the hardcopy document in the scanner and then select a "Scan to email with RMS" command. The scanner then prompts the user to enter the recipient information ("to," "cc" and "bcc") and other information. The actually scanning step S51 may be performed before, after or concurrently with steps S52 and S53.

For a user operating the client computer 40 to send an email, the digital document can be obtained in step S51 in any suitable way, and step S52 entails sending an email using an email application of the client computer and attaching the digital document as an attachment. The client computer automatically performs step S53.

Based on the attention information (and optionally other information) received from the scanner 30 or the client 40, and applying one of the stored attention-rights rules, the RMS server 10 searches for a suitable rights management policy from the existing policies stored on the RMS (step S62). This is done by comparing a list of all recipients of the email, containing the user names and the corresponding rights to be granted for the recipients based on their attention types, with existing rights management policies in the stored policy table.

For example, suppose the attention information for the email specifies that the "to" recipient is user U1, the "cc" recipients are users U2 and U3, and the "bcc" recipient is user U4. Also suppose that the attention-rights rule shown in FIG. 3A is to be used. Applying this attention-rights rule, the list of all recipients with corresponding rights for this email will be as shown in FIG. 4: user U1 (a "to" recipient) is to be granted view, edit and print rights; user U2 (a "cc" recipient) is to be granted view right only; user U3 (a "cc" recipient) is to be granted view right only; and user U4 (a "bcc" recipient) is to be granted no rights. Comparing this recipients list with existing policies in the example shown in FIG. 2, the RMS server 10 will determine that Policy 3 matches the recipients list. Note that Policy 3 does not list user U4, which means it grants no right to U4. It should be noted that a policy is not considered to match the recipient list if the policy grants access to other users that are not recipients of the email. For example, if Policy 3 additionally lists user U5 and grants some rights to U5, then it does not match the recipient list shown in FIG. 4.

In actual implementations, the search step S62 may be performed in a step-by-step manner to progressively eliminate existing policies that do not match the recipients list. For example, the RMS may first compare the list of "to" recipients with all existing policies to eliminate policies that do not provide the desired access rights for the "to" recipients. The RMS then compares the list of "cc" recipients with the remaining existing policies to eliminate policies that do not provide the required access rights for the "cc" recipients. The comparison is repeated for the list of "bcc" recipients. Then the remaining policies are checked to see whether they grant rights to any user not in the recipient list.

If the comparison step finds an existing policy that matches the recipients list of the email ("Y" in step S63), the matching policy is selected (step S64). If not ("N" in step S63), a new policy is created based the recipients list and added to the policy table (step S65). For example, in the above example, if the existing policy table did not contain Policy 3, then this policy would be added to the policy table.

As mentioned earlier, the RMS server 10 may store a small number of attention-rights rules to be used for various situations. One of the rules may be set as default by a system administrator. Alternatively, the user (email sender) may indicate a preference for stricter or less strict access control and the RMS server 10 may select one of the rules based on the user's preference. In the latter case, the information transmitted by the scanner 30 or client 40 in step S53 will include an indication of the user's preference. As another alternative, one default attention-rights rule such as that shown in FIG. 3A is normally used, except in certain situations such as: (1) if the email is sent from the sender to him/herself, then the access right granted the recipient will give all access rights. (2) If the subject of the email includes the word "confidential," then the access rights for all recipients will be "read only" (i.e. view right is granted but edit or print right is not granted). (3) If the subject or the body of the email includes the term "Read only," then the access rights for all recipients will be "read only." (4) If the email is specified as being "High importance" or "High priority," then the access rights for all recipients is "Read only." Etc. FIG. 5 illustrates an optional step S61 for choosing the attention-rights rule before the searching step S62.

After selecting or creating the policy, the RMS server 10 generates a document ID, which is a unique ID to be used to identify the document for rights management purposes, associates the document ID with the selected or created policy, and stores it in a document ID database (step S66). The RMS server 10 also generates an encryption key, preferably based on the document ID using a key-generation algorism (step S67). The RMS server 10 then transmits the selected or created policy (as represented by the policy name rather than the policy content), the document ID, the encryption key, and an RMS server ID back to the scanner 30 or client 40 (step S68). The RMS server ID is an ID that identifies the RMS server. The RMS server 10 may encrypt the various items before transmitting them to the scammer/client. For security reason, the encryption key is preferably not stored on the RMS server after it is transmitted to the scanner/client; it can be generated again later when needed.

After receiving the rights management policy name, the document ID, the RMS server ID and the encryption key from the RMS server 10, the scanner 30 or client 40 encrypts the document using the encryption key (step S54). It also adds the rights management policy name, document ID, and RMS server ID to the encrypted document as metadata (step S54). For security reasons, the scanner 30 or client 40 deletes the encryption key after using it. The scanner 30 or client 40 then transmits the email with the attachment document (encrypted and with the metadata added) to the mail server 20 (step S55). For security reasons, the scanner may delete copies of the scanned file after the scan to email operation. The mail server 20 functions in similar ways as conventional mail servers and transmits the email to the recipients (step S56).

After the document is received by the email recipients, access control for the document can be enforced in similar manners as in existing digital rights management systems. In one example, an email recipient downloads the attached document to his local computer, and attempts to access it using an appropriate application on his computer. The application contacts the RMS server 10 (using the server ID contained in the document metadata) to seek permission, by transmitting the document ID and the user ID of the user. The RMS server 10 consults the document ID database, which contains the association of document IDs with rights management policies, to determine what policy is associated with this document ID. Then, using the stored rights management policy table, the RMS server determines what access rights the particular user has for that document ID. The RMS then transmits a response to the user's local computer, and based on this response, the application on the user's computer will permit or deny the document access request.

It is noted that for purposes of the above described access-control operation, it is not necessary for the encrypted document to carry the policy name in its metadata; the document ID and RMS server ID in the document metadata are sufficient to allow the RMS server 10 to determine access rights of the particular user, because the server stores the document ID database which associates the document ID with a policy name (refer to step S66 of FIG. 5). Alternatively, the policy name stored in the document metadata may be transmitted by the local application to the RMS server, in which case the server does not need to consult the document ID database, because it can determine the access right of the particular user by referring directly to the rights management policy table. Thus, it can be seen that in step S68 of the email-sending process, the data items transmitted from the RMS server 10 to the scanner 30 or client 40 are not all mandatory; either the policy name or the document ID may be omitted.

Also, it is noted that in the email-sending process shown in FIG. 5, the scanner/client does not transmit a copy of the document to the RMS server; rather, encryption is done by the scanner/client using the encryption key returned by the server. This approach is preferred for security and efficiency purposes. Alternatively, encryption may be done by the RMS server, but this will require the scanner/client to transmit a copy of the document to the server and the server to transmit the encrypted copy back to the scanner/client. This alternative approach is less secure and also increases network traffic.

In the process shown in FIG. 5, the encryption key is generated by the RMS server 10 and transmitted to the scanner/client. Alternatively (less preferred), the encryption key may be generated by the scanner/client; in such a case, the scanner/client would need to transmit the encryption key to the RMS server so that it can be used later to permit access to the file by the appropriate user.

The above-described method for automatically associating rights management policy to emailed documents has many advantages. It is easy to use for the user because the user is not required to select a policy from a list of many policies. Also, new rights management policies can be automatically added to the policy table and the user is not required to manually create them. This method is particularly convenient for "scan to email" operations carried out at a scanner, because the scanner's user interface panel is typically smaller and more limited compared to a full keyboard/mouse based user interface of a computer. The method reduces the amount of input required by the user using the scanner panel.

This method can be implemented as an application on the scanner 30 or as middleware that interacts with the email application on the client 40.

It will be apparent to those skilled in the art that various modification and variations can be made in the digital rights management method and related apparatus of the present invention without departing from the spirit or scope of the invention. Thus, it is intended that the present invention cover modifications and variations that come within the scope of the appended claims and their equivalents.

What is claimed is:

1. A digital rights management method implemented in a rights management system, the system including a rights management server computer and a client, the client being a client computer or a scanner, the method comprising:
   (a) the rights management server storing a rights management policy table which contains a plurality of rights management policies, each rights management policy indicating one or more users and document access rights granted or denied to each user, and storing an attention-rights rule which defines a correspondence between attention types of email recipients and document access rights to be granted or denied for each attention type, the attention types including at least "to" and "cc;"
   (b) the client receiving an email command from a user, the email command specifying one or more users as recipients of an email, each recipient having an attention type, the email command further specifying a document to be attached in the email;
   (c) the client transmitting a request to the rights management server, the request specifying the recipients of the email and the attention type of each recipient, and indicating that a document is to be attached in the email;
   (d) the rights management server determining, based on the attention type of each recipient received from the client and by applying the attention-rights rule, document access rights to be granted or denied to each recipient of the email;
   (e) the rights management server determining whether the document access rights to be granted or denied to each recipient, as determined in step (d), match a rights management policy stored in the rights management policy table;

(f) if a matching rights management policy is found in step (e), the rights management server selecting the matching rights management policy;

(g) if a matching rights management policy is not found in step (e), the rights management server creating a new rights management policy based on the document access rights to be granted or denied to each recipient of the email determined in step (d), and storing the created rights management policy in the rights management policy table;

(h) the rights management server generating a unique document ID, associating the document ID with the rights management policy selected in step (f) or created in step (g), and storing the document ID;

(i) the rights management server transmitting an encryption key and the document ID to the client; and (j) the client encrypting the document using the encryption key received from the rights management server, adding the document ID as metadata to the document, and transmitting the email with the recipients specified in step (b) and with the encrypted document as an attachment to an email server.

2. The method of claim 1, wherein the document access rights including view, edit and print rights.

3. The method of claim 2, wherein the attention types additionally includes "bcc."

4. The method of claim 3, wherein the attention-rights rule defines that a recipient with the attention type "to" is to be granted view, edit and print rights, a recipient with the attention type "cc" is to be granted view right but denied the edit and print rights, and a recipient with the attention type "bcc" is to be denied view, edit and print rights.

5. The method of claim 3, wherein the attention-rights rule defines that a recipient with the attention type "to" is to be granted view and edit rights only, and a recipient with the attention type "cc" or "bcc" is to be granted view right only.

6. The method of claim 1, wherein the rights management server stores multiple attention-rights rules,
wherein the request in step (c) further indicates a preference for an attention-rights rule,
the method further comprising, before step (d), a step of the rights management server choosing one of the stored multiple attention-rights rules based on the preference.

7. The method of claim 1, wherein the rights management server stores multiple attention-rights rules,
wherein the request in step (c) further includes a subject and message of the email,
the method further comprising, before step (d), a step of the rights management server choosing one of the stored multiple attention-rights rules based on the subject or message of the email.

8. The method of claim 1, wherein step (i) further includes transmitting a name of the rights management policy selected in step (f) or the created in step (g) to the client, and wherein step (j) further includes adding the name of the rights management policy as metadata to the document.

9. A digital rights management method implemented in a rights management server computer, comprising:

(a) storing a rights management policy table which contains a plurality of rights management policies, each rights management policy having a name and indicating one or more users and document access rights granted or denied to each user;

(b) storing an attention-rights rule which defines a correspondence between attention types of email recipients and document access rights to be granted or denied for each attention type, the attention types including at least "to" and "cc;"

(c) receiving, from a client computer or a scanner, a request which specifies a list of one or more users as recipients of an email and an attention type of each recipient, the request further including that a document is to be attached in the email;

(d) determining, based on the attention type of each recipient and by applying the attention-rights rule, document access rights to be granted or denied to each recipient of the email;

(e) determining whether the document access rights to be granted or denied to each recipient, as determined in step (d), match a rights management policy stored in the rights management policy table;

(f) if a matching rights management policy is found in step (e), selecting the matching rights management policy;

(g) if a matching rights management policy is not found in step (e), creating a new rights management policy based on the document access rights to be granted or denied to each recipient of the email determined in step (d), and storing the created rights management policy in the rights management policy table;

(h) generating a unique document ID, associating the document ID with the rights management policy selected in step (f) or created in step (g), and storing the document ID; and (i) transmitting an encryption key and the document ID to the client computer or the scanner for encrypting the document to be attached in the email.

10. The method of claim 9, wherein the document access rights including view, edit and print rights.

11. The method of claim 10, wherein the attention types additionally includes "bcc."

12. The method of claim 11, wherein the attention-rights rule defines that a recipient with the attention type "to" is to be granted view, edit and print rights, a recipient with the attention type "cc" is to be granted view right but denied the edit and print rights, and a recipient with the attention type "bcc" is to be denied view, edit and print rights.

13. The method of claim 11, wherein the attention-rights rule defines that a recipient with the attention type "to" is to be granted view and edit rights only, and a recipient with the attention type "cc" or "bcc" is to be granted view right only.

14. The method of claim 9, wherein the rights management server stores multiple attention-rights rules,
wherein the request in step (c) further indicates a preference for an attention-rights rule,
the method further comprising, before step (d), a step of choosing one of the stored multiple attention-rights rules based on the preference.

15. The method of claim 9, wherein the rights management server stores multiple attention-rights rules,
wherein the request in step (c) further includes a subject and message of the email,
the method further comprising, before step (d), a step of choosing one of the stored multiple attention-rights rules based on the subject or message of the email.

16. The method of claim 9, wherein step (i) further includes transmitting a name of the rights management policy selected in step (f) or the created in step (g) to the client computer or the scanner.

17. A digital rights management method implemented in a client, comprising:

(a) receiving an email command from a user, the email command specifying one or more users as recipients of an email, each recipient having an attention type which is selected from a group comprising at least "to" and "cc," the email command further specifying a document to be attached in the email;

(b) transmitting a request to a rights management server, the request specifying the recipients of the email and the attention type of each recipient, and indicating that a document is to be attached in the email;

(c) receiving from the rights management server a response to the request, the response including a document ID and an encryption key for encrypting the document;

(d) encrypting the document using the received encryption key;

(e) adding the document ID as metadata to the document; and (f) transmitting the email with the recipients specified in step (b) and with the encrypted document as an attachment to an email server.

18. The method of claim 17, wherein the group further comprises "bcc."

19. The method of claim 17, wherein the client is a scanner, the method further comprising, before step (a), scanning a hardcopy to generate the document in digital form.

20. The method of claim 17, wherein the response in step (c) further includes a name of a rights management policy, and wherein step (e) further includes adding the name of the rights management policy as metadata to the document.

* * * * *